May 18, 1965   W. A. ZECH ET AL   3,184,153
ROTOR CONSTRUCTION
Filed Jan. 18, 1962   2 Sheets-Sheet 1
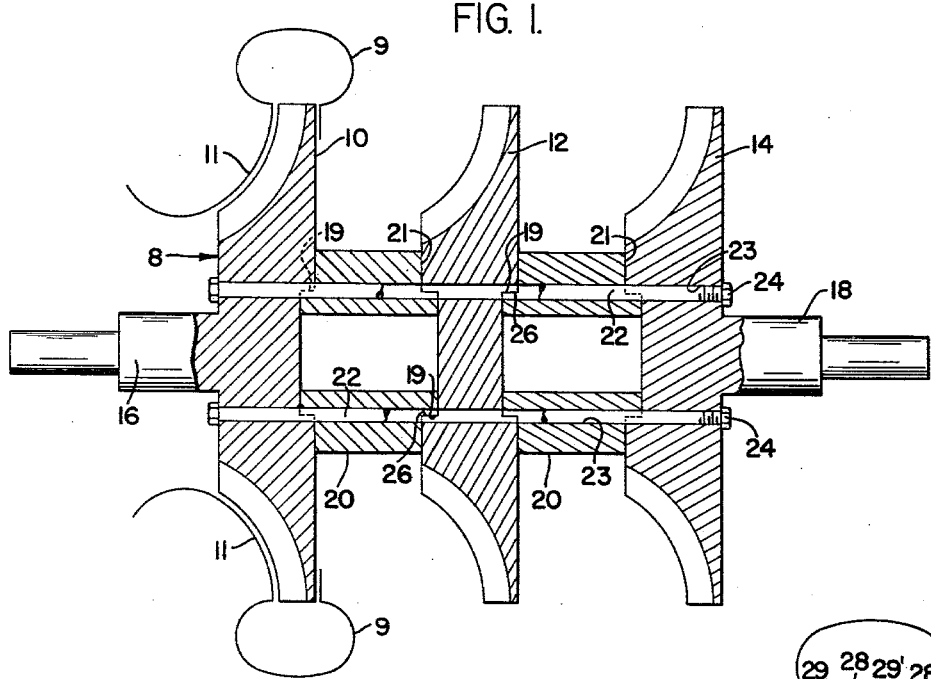
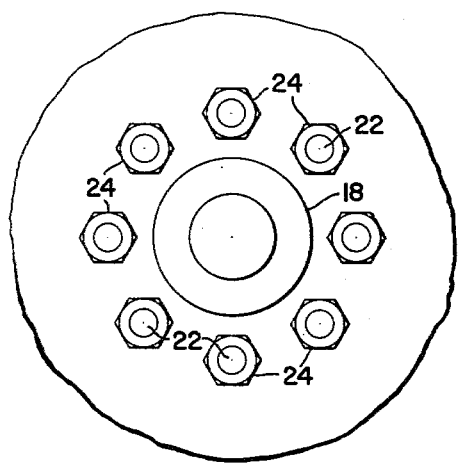
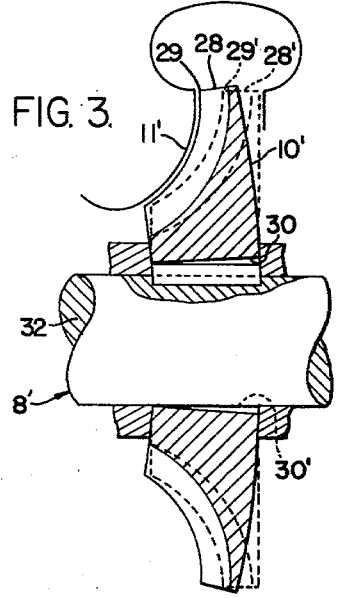
INVENTORS:
WILLIAM A. ZECH
FRED K. KUNDERMAN
BY
AGENT 3,184,153
ROTOR CONSTRUCTION
William A. Zech, Clarence, and Fred K. Kunderman, North Collins, N.Y., assignors to Joy Manufacturing Company, Pittsburgh, Pa., a corporation of Pennsylvania
Filed Jan. 18, 1962, Ser. No. 167,058
2 Claims. (Cl. 230—134)

This invention relates to fluid compressors and more particularly to a multi-stage centrifugal compressor.

Rotors for multi-stage centrifugal compressors, with which this invention is concerned, comprise an elongated shaft suitably rotatably supported in axially spaced bearings. Impeller wheels having a bore centrally therethrough are secured in axially spaced relation to such shaft so that the impellers are simultaneously rotated upon rotation of such shaft. It has been the practice to secure the impeller wheels to the shaft by means of suitable keys and to maintain the axial spacing of the wheels by suitable tubular spacers slidably fitted on the shaft and having the end thereof in abutting engagement with adjacent impeller wheels. Other suitable means are known to those skilled in the art, for example, the combination of keys and snap rings, for securing the impeller wheels to the shaft. Although such devices have served the purpose, they have not proved entirely satisfactory under all conditions of service for the reasons that considerable difficulty has been experienced in piloting the discs on the shaft, controlling the axial displacement of the disc on the shaft, limiting the distortion of the disc by centrifugal forces and keeping the critical speed of the rotor design above the operating speed of the machine.

Considering the above difficulties in detail: piloting the disc which involves maintaining its concentricity with mounting bearings, is readily accomplished in relatively slow speed machines by mounting a disc having an axial bore therethrough upon a shaft, rotatable in mounting bearings, engaging the axial bore with a close mechanical or thermal fit. For high speed machinery, however, the tangential stress component of the centrifugal force, resulting from high speed rotation of the disc, is of sufficient magnitude to cause radial growth of the bore which growth results in loosening the above cited fit between the bore and the shaft. Such loosening requires that piloting must be accomplished by special piloting mechanisms incorporated in the design. Such piloting mechanisms allow the rotor to become unbalanced at high speed, which results in damaging vibrations in the rotor. Theoretical considerations show that decreasing the bore diameter will lower the tangential stress at this point and consequently reduce the radial growth of the impeller bore, thus mitigating the structural and mechanical problem of piloting the disc. However, such reduction of bore diameter with a concomitant reduction in the shaft diameter results in a lower critical speed of rotation for the rotor, of which such discs and shaft are a part. Improvement in this direction is therefore limited by the necessity of designing a rotor having a critical speed above the maximum operating speed for which the apparatus is designed. It should be noted that the critical speed of a rotor is a function, mainly, of the diameter of the shaft of such rotor.

In slow speed machinery, controlling the axial displacement of an impeller disc is merely a matter of suitable spacers and/or thrust washers incoporated in the assembly of several discs upon a single shaft. In high speed rotating machinery the cotrol of axial displacement is complicated by the fact that the impeller discs are axially unsymmetrical having a larger diameter at one end of the disc than at the other. Tangential stress and consequently radial growth are greater in the large diameter portion of the disc than in the smaller diameter portion and such inequality of radial growth results in an axial displacement of the large diameter rim in relation to the smaller diameter portion of the disc. Since such impeller discs must be surrounded by close fitting stationary portions of the compressor housing known as shrouds, such axial displacement of the rim necessitates a greater clearance between the impeller discs and the shrouds, when the machine is at rest, to allow for the axial displacement above described without damaging contact between the rotating impeller discs and the stationary shrouds. Added clearance between the shrouds and the impeller discs reduces the efficiency of a centrifugal compressor as is well kown.

The high mechanical stresses to which the impeller disc is subjected can produce other distortions and can cause ruptures in the material of the disc with consequent damaging disintegration.

The present invention contemplates the construction of a multi-stage compressor rotor from a plurality of solid disc impellers, having no axial bore, secured in axial alignment and axially spaced relationship by a plurality of spacers and tie bolts. This rotor is to be piloted for rotation about the axis common to the impeller discs by means of stub shafts integral with the outer end surfaces of the outermost impeller discs on the rotor. The use of such solid disc impellers either eliminates or greatly reduces the hereinbefore cited difficulties and gives rise to the following advantages: elimination of the axial bore reduces the maximum tangential stress, at a given speed of rotation, to less than one-half of that present in a disc having an axial bore. Lower tangential stress within the impeller disc minimizes the axial deflection of the impeller and concomitantly minimizes the necessary shroud clearance thus increasing the efficiency of the compressor over that of earlier designs. Elimination of the pilot fit, associated with the formerly used axial bore, together with lower tangential stress on the impeller disc makes it possible to pilot all the impellers by means of simple stub shafts and bearing arrangements in place of more expensive and less effective piloting mechanisms associated with discs having axial bores. This construction also eliminates the need for keys and lock nuts, reducing the cost. Susbtitution of relatively large diameter spacers in place of a shaft of limited diameter results in a rotor design having a critical speed much greater than that associated with former methods of construction, which greater critical speed provides either an additional margin of safety or an opportunity for operating the rotor at a higher speed with a concomitant increase in the capacity of the compressor (higher delivery pressure or greater delivery velocity or both).

It is therefore an object of this invention to provide a new and improved rotor for a high speed multi-stage centrifugal pump.

It is a further object of this invention to provide a new and improved rotor for a high speed multi-stage centrifugal pump which provides impeller discs designed to have a lower tangential stress component of the centrifugal force developed at a given speed.

It is a more specific object of this invention to provide a new and improved rotor for a high speed multi-stage centrifugal pump which provides impeller discs more readily retained in concentric rotation about the rotor axis.

It is a further specific object of this invention to provide a new and improved rotor for a high speed multi-stage centrifugal pump which provides a rotor designed to have a critical speed above the maximum operating speed necessary in such a device.

It is a still further specific object of this invention to provide a new and improved rotor for a high speed multi-stage centrifugal pump which provides a rotor having impeller discs subject to a minimum axial displacement of the impeller rims, relative to the impeller central portions, at a given rate of rotation, so that smaller clearances are necessary between rotating and non-rotating parts of the pump.

Another specific object of this invention is to provide a new and improved rotor for a multi-stage centrifugal pump comprising a plurality of axially aligned, axially spaced, solid impeller discs spaced apart and secured in alignment by a spacer member between each pair of discs and piloted for rotation about their common axis by outwardly extending axially aligned stub shafts on the outer surfaces of the two end impeller discs, respectively, such spacers being of relatively large diameter as compared to the diameter of such stub shafts.

Still another specific object of this invention is to provide a new and improved radial flow centrifugal pump rotor having a plurality of coaxial impeller discs, such discs being solid to reduce tangential stresses when rotated a high speed and being axially spaced apart by cylindrical spacers overlappingly engaged with reduced diameter portions of the respective end surfaces of the discs to provide further reduction of tangential stresses in the discs.

It is a final specific object of this invention to provide a new and improved method of constructing a rotor for a high speed multi-stage centrifugal pump which provides a rotor having a higher critical speed and lower tangential stresses in the impeller discs of such rotor.

These and other objects and advantages of this invention will become more readily apparent upon consideration of the following description and drawings, in which:

FIG. 1 is a side elevational view, partly in axial section, of a multi-stage compressor rotor constructed according to the principles of this invention.

FIG. 2 is an enlarged, end elevational, fragmentary view of the rotor of FIGURE 1.

FIG. 3 is an axial section through one impeller disc of a rotor designed according to earlier methods of construction showing in solid outline the shape of such rotor when operated at high speed as compared with a dotted outline showing the shape of the same rotor at rest.

Figure 4:
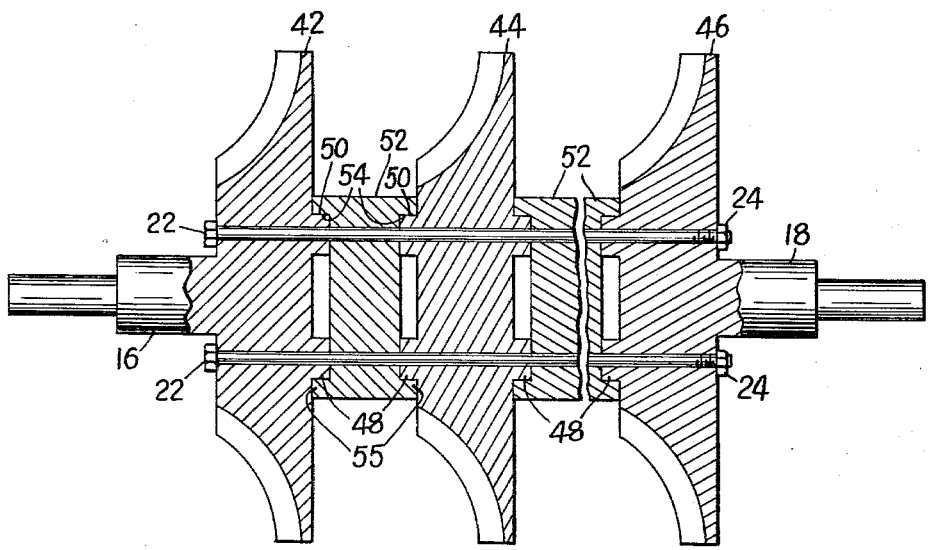
FIG. 4 is a side elevational view, partly in axial section of a preferred embodiment of the multi-stage compressor rotor of this invention.

In FIG. 1 there is shown a multi-stage compressor rotor 8 constructed according to the principles of this invention and comprising a plurality of impeller discs 10, 12 and 14 which are left end, intermediate, and right end impeller discs, respectively, together with hollow cylindrical spacers 20 therebetween and axially aligned therewith. The rotor 8 is surrounded by a stationary casing partly shown at 9 which includes shroud portions 11 closely adjacent to the impeller discs 10, 12 and 14 respectively. The impeller discs 10, 12 and 14 are secured coaxial with each other by a plurality of tie bolts 22 and tie bolt nuts 24. The spacers 20 have reduced diameter end portions 19 forming annular shoulder surfaces 21 at the end of the spacers 20. The impeller disc 12 has axially aligned counterbores 26 to interferingly receive the end portions 19 of each of two spacers 20, respectively to hold the impeller disc 12 and the spacers 20 in rigid axial alignment. The right-hand surface 11 of the left-hand impeller disc 10 has a similar shallow counterbore 26 which similarly receives the reduced diameter portion 19 of one of the spacers 20. In like manner the right-hand impeller disc 14 having a similar counterbore 26 in its left-hand surface similarly receives the reduced diameter portion 19 of the other spacer 20. The counterbores 26, the reduced diameter portions 19 and the shoulder portions 21 are all axially aligned and suitably diametrically dimensioned so that a plurality of intermediate impeller discs 12 assembled with a suitable number of spacers and one left-hand disc 10 with one right-hand disc 14 will form a rigidly constructed rotor 8 all parts of which are coaxial with each other.

A plurality of radially aligned, circumferentially spaced, parallel bores 23 in each of the impeller discs and spacers are axially aligned with each other by suitable positioning of the discs and spacers to closely receive elongated anchor members such as tie bolts 22 provided with a suitable retaining means such as a nut 24. A plurality of these tie bolts 22 rigidly secure the component parts in the already established axial relationship with axial spacing between the impellers suitable for the machine in which this rotor 8 is to be employed.

Extending from the left-hand surface of the left-end impeller disc 10 and from the right-hand surface of the right end impeller disc 14 are cylindrical pilot members 16 and 18, respectively, coaxial with the discs 10 and 14 and integrally formed therewith. These pilot members 16 and 18 are of a size, profile and length to be suitably received by bearing elements (not shown) of the compressor for which this rotor 8 is designed and have a diameter less than half the diameter of the spacers 20 to provide clearance for the insertion of the tie bolts 22 as shown. The pilot members 16 and 18 are also provided with a reduced diameter end portion to suitably engage a suitable drive means (not shown) which provides rotational energy for the rotor 8.

It is to be noted that, although the use of hollow cylindrical spacers and tie bolts has been described, the principles of this invention would cover the use of solid spacers and other means of securing the rigid assembly of the spacers and impeller discs such as welding or the like. It is further to be noted that the principles of this invention apply to the use of counterbored spacers with reduced diameter end surface portions on the impeller discs as shown in FIG. 4 and hereinafter described. Further, each spacer could be an axially extended integral portion of one of the discs engaging an axial counterbore in the next adjacent disc as hereinbefore described.

FIG. 3 illustrates in somewhat exaggerated fashion the change of shape which takes place in an impeller disc 10' of a rotor 8' constructed according to the prior art and having a shroud portion 11' closely adjacent the impeller disc 10'. The disc 10' has a cylindrical bore 30' closely receiving a shaft 32, common to a plurality of discs (only one of which is shown) all of which are similar to the disc 10'. It is to be noted that the right-hand portion of the impeller disc 10', having an outer periphery or rim 28, has a much greater diameter and consequently a greater mass than the left-hand portion of the impeller disc 10'. Tangential stresses, which, in any such disc are known to be a maximum at the axial bore, are much greater in the right-hand portion of the impeller disc 10' than in its left-hand portion. The result is that the original cylindrical bore 30' of the impeller disc 10' becomes a conical bore shown at 30 when the rotor 8' is revolved at high speed. It will be appreciated that such expansion or stretching of the bore 30' makes it difficult to maintain the concentricity of the impeller disc 10' with the shaft 32 upon which it is mounted. This same change of shape results in axial translation of an edge 29 of the rim 28 in a manner similar to that shown as a difference in position between a rest position 29' and the high speed position 29 of the edge of rim 28. Such axial translation of the rim 28 necessitates a built in clearance between the shroud 11' and the disc 10' at least equal to the distance from edge 29 to edge 29' as shown.

It is to be noted that the absence of an axial bore in the impeller discs, of this invention, 10, 12 and 14, respectively, obviates such piloting difficulties and reduces the maximum tangential stress to a value approximately half the amount of such stress in the impeller disc 10' when rotated at a given speed. The resultant reduction in the axial translation of the outer rims of the impeller discs 10, 12 and 14 reduces the necessary built in clearance between these discs and the shrouds 11 by approximately 50% and consequently increases the efficiency of the compressor in which the rotor 8 is used.

It is further to be appreciated that the effective diameter of the spacers 20 is larger than the diameter of the shaft 32 so that the rotor 8 has a critical speed higher than that of the rotor 8'.

It is also to be noted that the relatively small diameter of the pilot members 16 and 18 does not materially affect the critical speed of the rotor since these are supported portions closely received by the inner races of the bearing elements (not shown) so that the members 16 and 18 are not resiliently deformable by cyclic stresses, and further that such small diameter reduces the size and cost of the bearing elements needed to support the rotor 8 below the size and cost of bearings large enough to receive a shaft having a diameter as great as that of the spacers 20, which spacer diameter is limited only by the aerodynamically determined minor diameters of the impeller discs 10, 12 and 14.

A further advantage concomitant with the reduction in tangential stress hereinbefore mentioned is the reduction in danger and likelihood of destructive distortion and rupture of the impeller discs 10, 12 and 14 below the level of such danger to the impeller discs 10' of the rotor 8'.

In FIG. 4 there is shown, as a preferred embodiment of the principles of this invention, a multi-stage compressor rotor 40 comprising a plurality of impeller discs only three of which are shown at 42, 44 and 46, left end, intermediate and right end impellers, respectively, it being realized that any number of intermediate impellers 44 can be incorporated in the rotor 40 of this invention. The impellers 42, 44 and 46 are entirely similar to the impellers 10, 12 and 14, respectively, of the rotor 8 except for the omission of the counterbores 26 of impellers 10, 12 and 14 and the substitution of a ring shaped element 48 extending axially outward from the righthand surface of the left end impeller 42, from the lefthand surface of the right end impeller 46 and from both end surfaces of the intermediate impellers 44 as viewed in FIG. 4. As shown in FIG. 4 the ring elements 48 are coaxial with the impellers 42, 44 and 46 and have a rectangular cross section resulting in a cylindrical surface 50 which is a rereduced diameter portion of each impeller, respectively.

The impellers 42, 44 and 46 are axially spaced apart and secured in axial alignment by axially aligned cylindrical spacers 52, preferably solid but acceptably tubular, having blind axial counterbores 54 in each end forming ring portions 55 to mate with the surfaces 50 of the respective impellers. The dimensioning of the counterbores 54 and the surfaces 50 is such that a tight mechanical or thermal fit is produced therebetween, so that the spacers 52 provide centripetal stresses on the impellers 42, 44 and 46 which oppose the centrifugal stress applied to the impellers when rotated at high speeds. It is obvious that the ring elements 48 can be solid cylindrical bosses similarly positioned which provide the surface 50 to mate with the counterbores 54.

The spacers 52 also have circumferentially spaced bores extending axially therethrough to accommodate the tie bolts 22 which secure the impellers and spacers in axial alignment as described for the rotor 8.

The advantages of the rotor 40 over the rotor 8 reside in the aforementioned centripetal stress applied by the spacers 52 to the impellers 40, 42 and 44 resulting in less tangential stress on the rotor 40 than on the rotor 8 at a given speed of rotation, and further assuring that the mating of the counterbore 54 with the surface 50 will remain tight at all speeds of rotation.

It is to be realized that any desired number of impellers can be assembled to form the rotor 40 of this invention beginning with the use of just the two end impellers 42 and 46 and one spacer 52 and including the addition of as many intermediate impellers 44, with an equal number of spacers 52, as may be practical or desirable.

A preferred embodiment of this invention having been described it is to be realized that modifications thereof may be made without departing from the broad spirit and scope of this invention. Accordingly, it is respectively requested that this invention be interpreted as broadly as possible and be limited only by the prior art.

We claim:

1. A multi-stage centrifugal compressor rotor comprising: a first impeller disc; at least one intermediate impeller disc; a final impeller disc all of said discs being axially unsymmetrical coaxial with each other and axially spaced to form a set of tandem impeller discs; coaxial cylindrical journal means extending outwardly from said first and said final impeller discs in a direction away from said intermediate disc respectively to provide for rotation of said discs about a common axis; axially extending rings coaxial with each other about said common axis formed on the sides of said first disc and said final disc opposite said journal means; similar coaxial axially extending rings formed on both sides of said intermediate discs respectively; coaxial cylindrical spacer member located between adjacent ones of said discs, respectively; said spacer members having coaxial ring portions closely internally receiving said rings, respectively; and said spacer members having a diameter greater than the diameter of said journal means.

2. A multi-stage centrifugal compressor rotor comprising: a first impeller disc; at least one intermediate impeller disc; a final impeller disc all of said discs being axially unsymmetrical coaxial with each other and axially spaced to form a set of tandem impeller discs; coaxial cylindrical journal means extending outwardly from said first and said final impeller discs in a direction away from said intermediate disc respectively to provide for rotation of said discs about a common axis; axially extending cylindrical bosses coaxial with each other about said common axis formed on the sides of said first disc and said final disc opposite said journal means; similar coaxial axially extending cylindrical bosses formed on both sides of said intermediate discs respectively; a spacer member symmetrical about said common axis located between each pair of adjacent ones of said discs; said spacer members having coaxial ring portions closely internally receiving said bosses, respectively; and said spacer members having outer surfaces at a distance from said common axis greater than the radius of said journal means.

References Cited by the Examiner

UNITED STATES PATENTS

| 854,012 | 5/07 | Akimoff | 103—108 |
|---|---|---|---|
| 1,664,492 | 4/28 | Smith et al. | 230—134.4 |
| 1,798,787 | 3/31 | Conant | 103—102 |
| 2,189,252 | 2/40 | Reggio | 230—134.48 |
| 2,422,763 | 6/47 | Wislicenus | 230—130 |
| 2,662,685 | 12/53 | Blanc | 253—39 |
| 2,799,445 | 7/57 | Hull | 253—39 |

FOREIGN PATENTS

| 704,801 | 2/31 | France. |
|---|---|---|
| 341,892 | 10/21 | Germany. |
| 767,808 | 8/53 | Germany. |
| 902,942 | 1/54 | Germany. |
| 585,086 | 1/47 | Great Britain. |
| 283,948 | 3/31 | Italy. |
| 341,030 | 10/59 | Switzerland. |

JOSEPH H. BRANSON, Jr., *Primary Examiner.*